(12) United States Patent
Gomercic et al.

(10) Patent No.: US 7,532,332 B2
(45) Date of Patent: May 12, 2009

(54) PROJECTOR FOR AN ARRANGEMENT FOR THREE-DIMENSIONAL OPTICAL MEASUREMENT OF OBJECTS

(75) Inventors: Mladen Gomercic, Braunschweig (DE); Detlef Winter, Vordorf (DE)

(73) Assignee: GOM Gesellschaft fur Optische Messtechnik mbH, Braunschweig (DE)

( * ) Notice: Subject to any disclaimer, the term of this patent is extended or adjusted under 35 U.S.C. 154(b) by 0 days.

(21) Appl. No.: 11/379,313

(22) Filed: Apr. 19, 2006

(65) Prior Publication Data

US 2006/0244977 A1    Nov. 2, 2006

(30) Foreign Application Priority Data

Apr. 21, 2005   (DE) .................. 10 2005 018 656

(51) Int. Cl.
*G01B 11/24* (2006.01)
(52) U.S. Cl. ........................ 356/610; 446/242
(58) Field of Classification Search ........... 356/610; 382/154, 203; 359/196–201; 446/242, 243
See application file for complete search history.

(56) References Cited

U.S. PATENT DOCUMENTS

| | | | |
|---|---|---|---|
| 3,866,052 A * | 2/1975 | Di Matteo et al. ........... | 250/558 |
| 4,668,984 A * | 5/1987 | Rosenfeld .................... | 348/136 |
| 4,871,256 A | 10/1989 | Grindon ...................... | 356/376 |
| 6,495,848 B1 * | 12/2002 | Rubbert ................. | 250/559.22 |
| 6,549,289 B1 * | 4/2003 | Ellis ........................... | 356/603 |
| 6,674,893 B1 * | 1/2004 | Abe et al. ................... | 382/154 |
| 6,700,669 B1 * | 3/2004 | Geng ......................... | 356/603 |
| 6,813,035 B2 * | 11/2004 | Hoffmann ................... | 356/603 |
| 6,914,685 B2 * | 7/2005 | Chang ........................ | 356/610 |

FOREIGN PATENT DOCUMENTS

JP      2003-042736       2/2003

* cited by examiner

*Primary Examiner*—L. G Lauchman
*Assistant Examiner*—Rebecca C Slomski
(74) *Attorney, Agent, or Firm*—Whitham Curtis Christofferson & Cook, PC

(57) ABSTRACT

A projector for an arrangement for three-dimensional optical measurement of objects (6) with the aid of a topometric measuring method in which images of projection patterns (2) projected onto an object (6) are acquired and evaluated, the projector having an illumination unit (4) and a carrier (1), provided with projection patterns (2), for projecting the light structures. The object is achieved by virtue of the fact that projection patterns (2) are arranged on the carrier (1) in the form of repeating geometrical individual structures, and the carrier (1) with the projection patterns (2) is movably arranged in such a way that during the movement and illumination selected regions of the projection pattern (2) are displaced into the beam path (7) between the illumination unit (4) and object (6), and a stripe-shaped pattern is imaged on the object (6) by means of the movement unsharpness.

20 Claims, 10 Drawing Sheets

PROJECTOR FOR AN ARRANGEMENT FOR THREE-DIMENSIONAL OPTICAL MEASUREMENT OF OBJECTS

The invention relates to a projector for an arrangement for three-dimensional optical measurement of objects with the aid of a topometric measuring method in which images of projection patterns projected onto an object are acquired and evaluated, the projector having an illumination unit and a carrier, provided with projection patterns, for projecting the light structures.

The three-dimensional optical acquisition of object surfaces by means of optical triangulation sensors using the principle of topometry, also termed stripe projection, is sufficiently well known. In this case, different striped patterns are projected onto the object to be measured, observed by one or more cameras and subsequently evaluated with computer assistance.

The fundamentals and practical applications of such topometric measuring methods are described in detail, for example, in Bernd Breuckmann: "Bildverarbeitung und optische Messtechnik in der industriellen Praxis" ["Image processing and optical metrology in industrial practice"], 1993, Franzis-Verlag GmbH, Munich.

In Reinhard W. Malz: "Codierte Lichtstrukturen für 3-D-Messtechnik und Inspektion" ["Coded light structures for 3-D metrology and inspection"], Reports of the Institute for Technical Optics of Stuttgart University, January 1992 there is a description of various apparatuses with the aid of which such measurement assemblies can be implemented.

One technical embodiment is disclosed, for example, in DE 44 15 834 C2, in which the projected light structures are produced by means of a multiplicity of projection gratings which are arranged in correct phase relation on a carrier and come to be projected sequentially by linear displacement of the carrier.

Furthermore, a carrier for a number of linear parallel groove gratings arranged juxtaposed is described in EP 0 379 079 B2, the carrier being displaceable in a defined fashion.

DE 197 43 811 A1 discloses an arrangement in which spiral stripes are arranged on a circular disk.

U.S. Pat. No. 4,871,256 likewise starts from a circular disk, circular stripes being involved here. The center of the circular stripes is located at the center of rotation of the disk.

It is common to these documents that the patterns on the carriers are stripes. These stripes can be produced with the aid of a known method of exposing a glass plate coated with a metal layer. This method can be used to produce both grating structures of high line density, but also to produce sinusoidal brightness curves, for example, with the aid of the Dittering method.

In the Dittering method, a sinusoidal brightness distribution of the projection grating, for example, is approximated by the composition of each individual grating line from a multiplicity of fine lines of different width.

It is an object of the invention to provide an improved projector with the aid of which, in conjunction with an unchanged measurement quality, simpler structures on the carrier ensure a more cost-effective production. Moreover, the aim is to achieve a very high measurement rate.

The object is achieved with the aid of the projector of the type mentioned at the beginning by virtue of the fact that projection patterns are arranged on the carrier in the form of repeating geometrical individual structures, and the carrier with the projection patterns is movably arranged in such a way that during the movement and illumination selected regions of the projection pattern are displaced into the beam path between the illumination unit and object, and a strip-shaped pattern is imaged on the object by means of the movement unsharpness.

By contrast with the Dittering method, use is made in the projector according to the invention of projection patterns on a carrier which themselves are again assembled from repeating filled individual structures arranged one below another such as, for example, triangles, circles, rhomboids or sines.

Here, the carrier is mounted in the projector such that during the illumination time it carries out a movement which results in a multiplicity of individual structures traversing the projection window.

Here, the projector is set up by selecting the size of the structures and the rate of movement such that striped patterns arise in the camera image owing to the movement unsharpness. The exposure time of the camera must also be appropriately adapted for this purpose. So many individual structures are arranged sequentially in each case that the image projected onto the object and acquired does not vary during the exposure time when the carrier is moving.

If the stripes are to be displaced or their width is to be varied, different regions are applied on the carrier in which the individual structures have varied positions and/or varied widths.

Thus, it need only be ensured during the execution of the method that the exposure or image acquisition is synchronized with the desired projection pattern. The rate of displacement of the carrier itself has no influence on the measuring accuracy.

When the carrier is at a standstill, a multiplicity of individual structures, for example, can be detected as projection pattern. These structures cannot be used during standstill for measurement using the stripe projection principle, only once the patterns move during the acquisition do the required stripes arise owing to movement unsharpness.

The invention can very easily supply a desired intensity distribution of the stripes by appropriate adaptation of the individual structures. There is thus no need to produce fine and expensive structures as in the case of the known Ditterung method. In addition, the carrier movement need not be stopped during measurement. Short measurement times are possible thereby.

The carrier can be movably arranged in the projector in such a way that a linear displacement of the carrier ensues. The projection patterns are then aligned in a correspondingly linear fashion.

In an alternative embodiment, the carrier is arranged movably in the projector in such a way that a rotational movement of the carrier ensues. The projection patterns are then aligned in a correspondingly circular fashion. This has the advantage that it is possible to measure without interruption or times of standstill.

In order to synchronize the projector, it is particularly advantageous when markings are arranged on the carrier for triggering the illumination unit and/or at least one observation camera such that illumination and/or acquisition ensues when a projection pattern assigned to a marking is aligned in the beam path between the illumination unit and object.

It is also possible to provide an encoder, coupled to the movement motor of the projection carrier, for triggering the illumination unit and/or observation camera such that illumination and/or acquisition ensues when the corresponding projection pattern is aligned in the beam path between the illumination unit and object.

In order to automate and achieve short measurement times, it is advantageous when the movement of the carrier ensues continuously.

Diverse variants are conceivable individually or in combination for the form of the projection patterns. It is advantageous when the projection patterns exhibit a multiplicity of sinusoidal curved shapes with dark colored areas below the sinusoidal arcs, a multiplicity of Gaussian curved shapes with dark colored areas below the Gaussian bell, a multiplicity of parabola-like curved shapes with dark colored areas below the parabolic segments, a multiplicity of spiked curved shapes with dark colored areas below the spikes, a multiplicity of filled circles lined up juxtaposed, a multiplicity of filled ellipses lined up juxtaposed, a multiplicity of filled rhomboids lined up juxtaposed, a multiplicity of filled triangles lined up juxtaposed and/or a multiplicity of filled polygons lined up juxtaposed.

The invention is explained below in more detail by way of example with the aid of the attached drawings, in which:

FIG. 8b shows an enlarged section of the top view from FIG. 8a.

Figure 1:
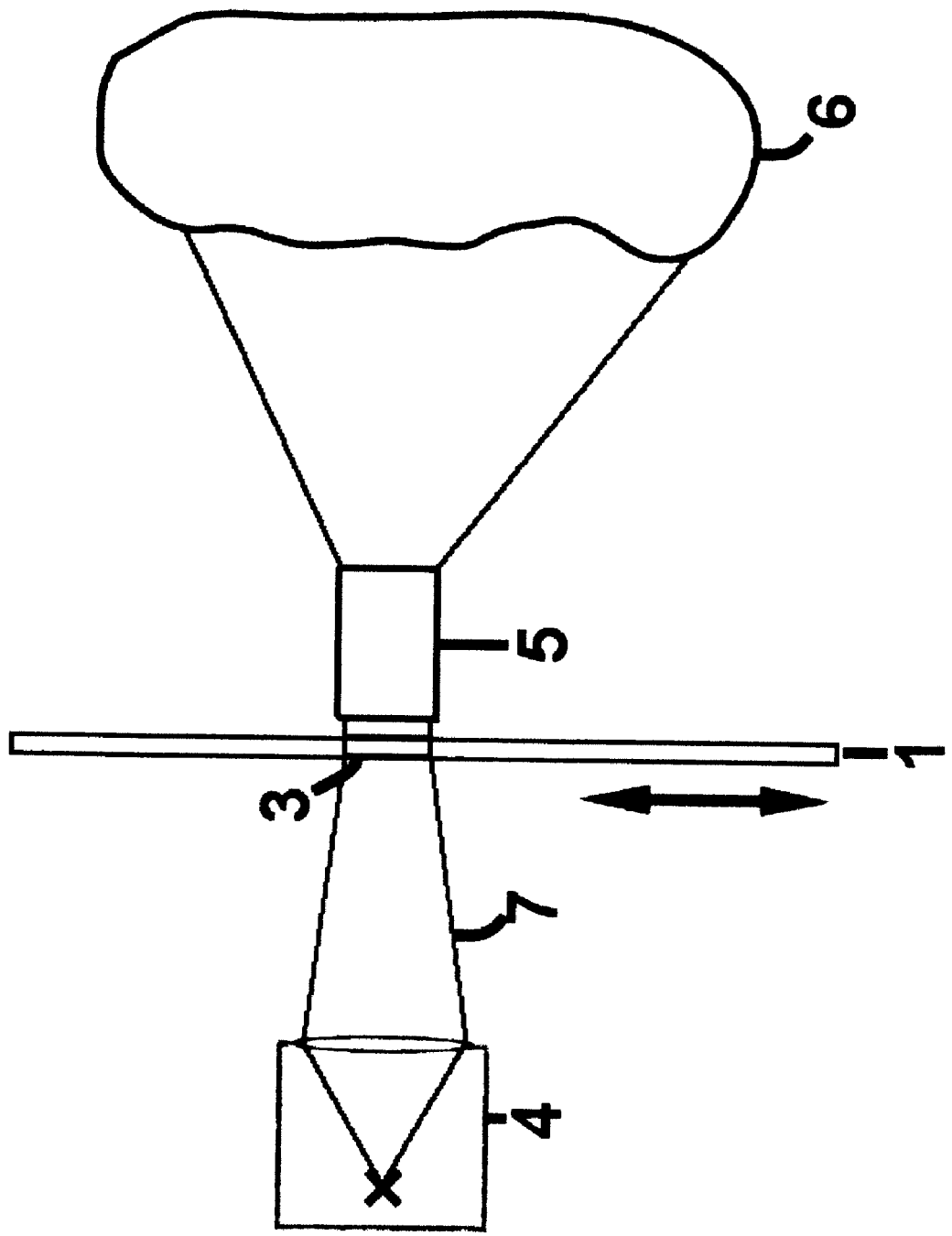
FIG. 1 shows a side view of an embodiment of the projector with linear carrier displacement.

FIG. 1 exhibits an embodiment of the projector in side view. The projector has a linearly movable carrier 1, arranged in the projector, with a projection pattern 2 on its surface. A projection window 3 bordering the carrier 1 is provided in the projector in order to irradiate a subregion of the projection pattern 2 as the carrier 1 is moved past the projection window 3. To this end, an illumination unit 4 with a proposed lens arrangement 5 is aligned with the projection window 3 and an object 6 such that the subregion of the projection pattern 2 is projected onto the object 6. The projection window 3 for a subregion of the projection pattern 2 is therefore located in the beam path 7 between the illumination unit 4 and the object 6. The lens arrangement 5 is provided in this case to fan out the projection rays onto the object 6. The image of the object 6 with the projection pattern 2 projected thereon is acquired by an observation camera and evaluated in a known way with computer assistance. The evaluation method itself is not the subject matter of the invention and will not be explained in more detail below, since topometric measuring methods are adequately known.

Figure 2:
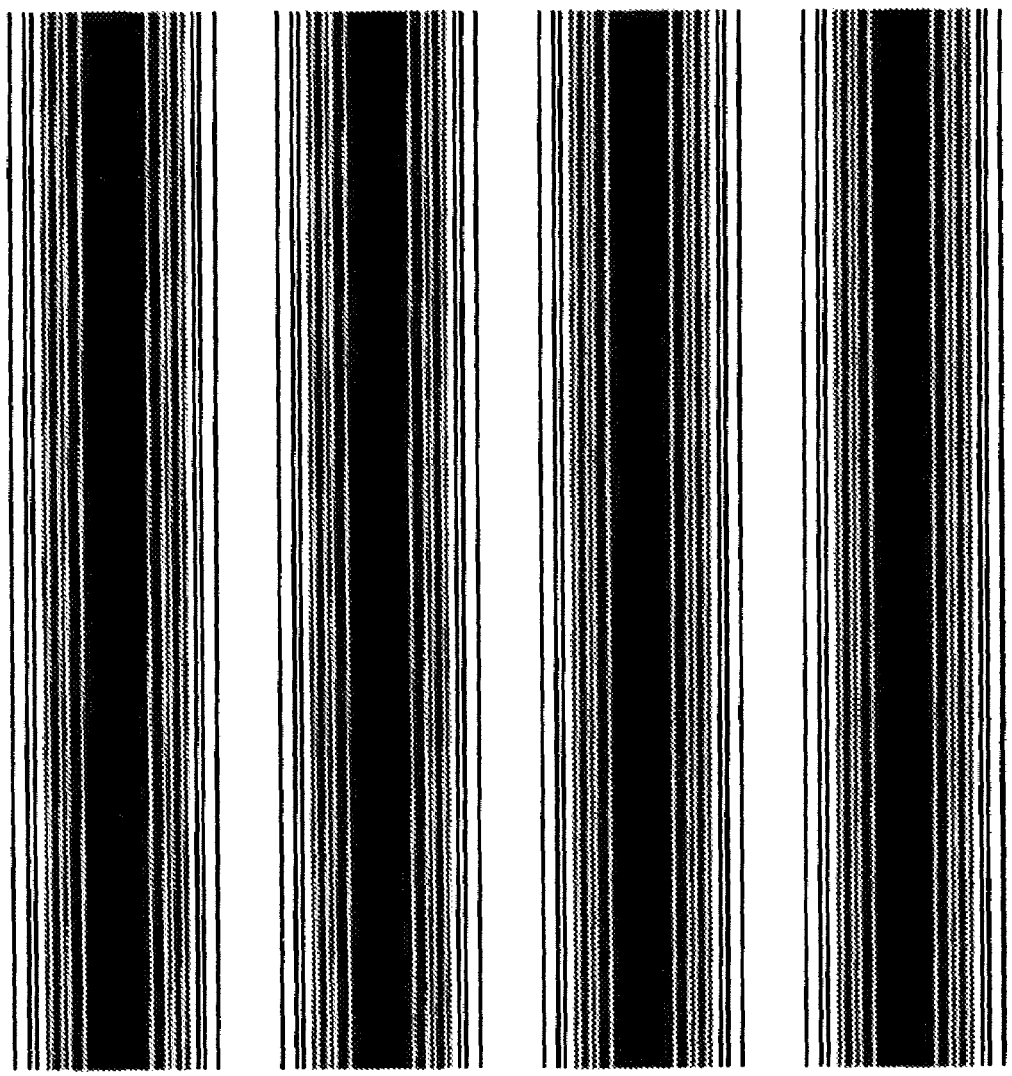
FIG. 2 shows a section of a projection pattern with a schematic illustration of a pattern, produced with the aid of the known Ditterung's method, having a sinusoidal brightness curve.

FIG. 2 shows diagrammatically how a sinusoidal brightness curve is produced with the aid of the known Dittering method. In this method, the individual projection lines of the projection pattern are respectively assembled, in turn, from fine lines whose thicknesses and spacings are selected such that a sinusoidal brightness curve, for example, is yielded upon projection.

Figure 3A:
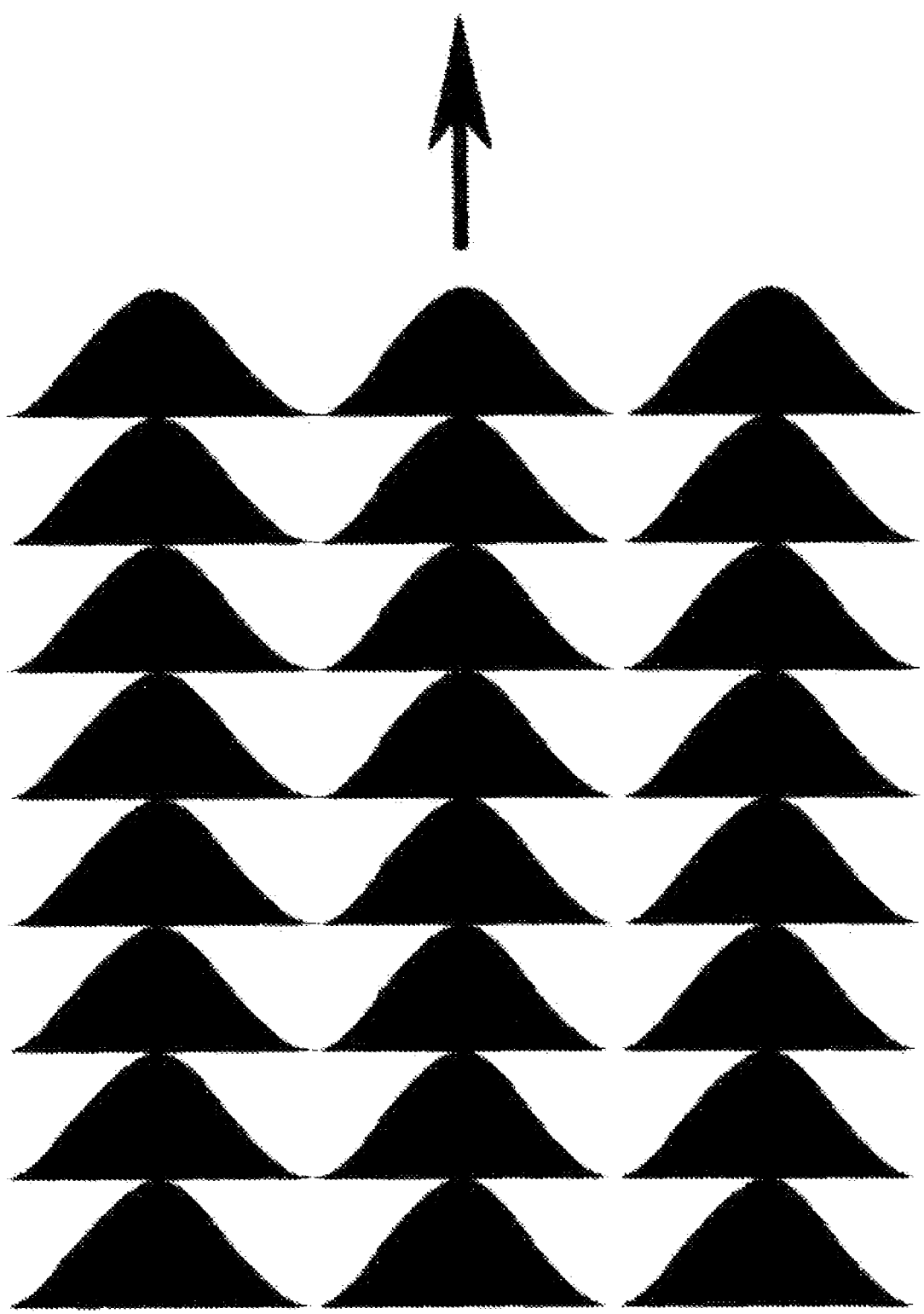
FIG. 3a shows the projection of a projection pattern having a sinusoidal pattern curve, with the carrier at standstill.

FIG. 3a illustrates an exemplary projection pattern 2 applied to a carrier. A multiplicity of dark colored full sine waves are to be seen which are arranged one below another. The upper region above the sine curve is, by contrast, transparent.

Figure 3B:
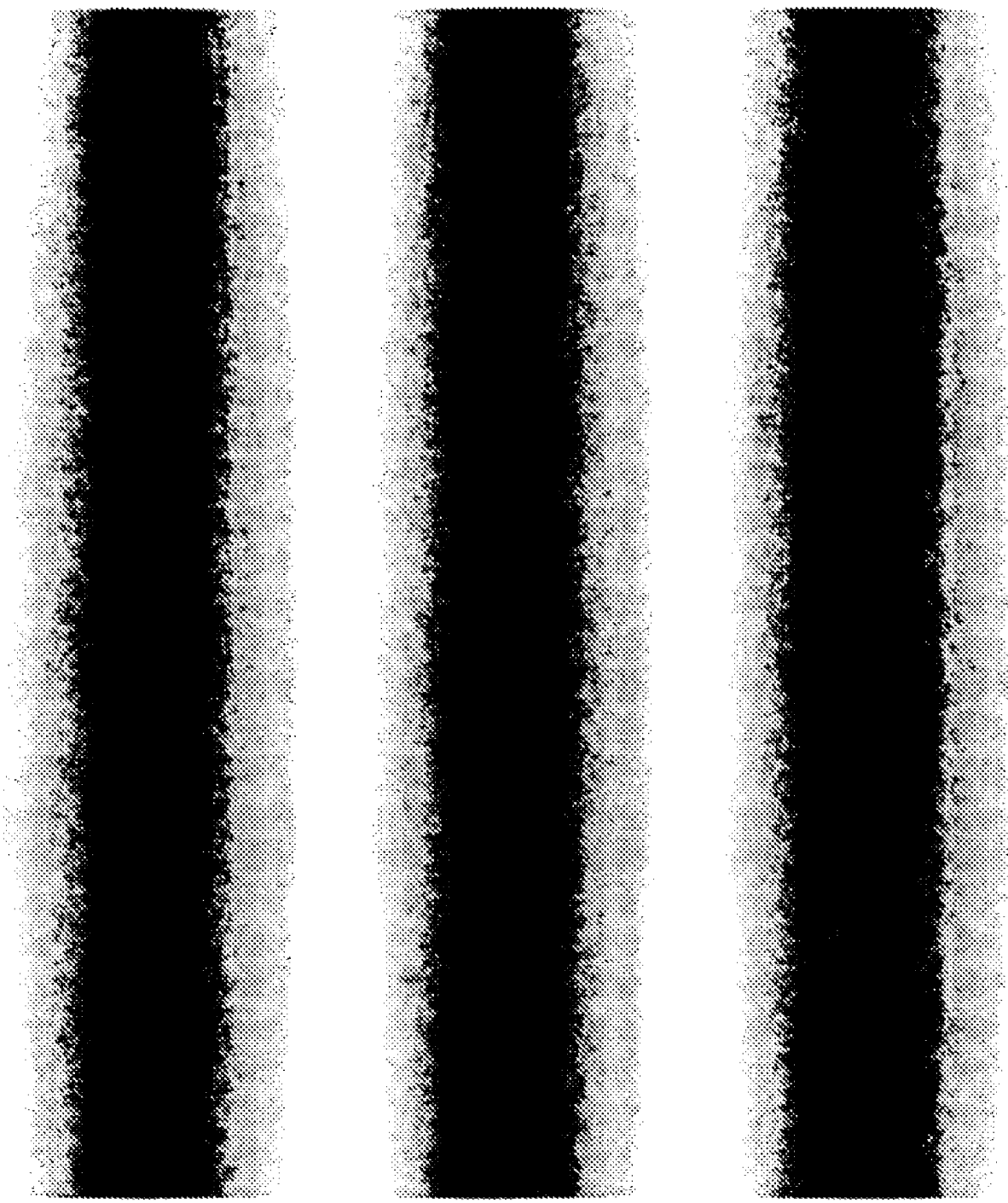
FIG. 3b shows the projection of the projection pattern from FIG. 3a, with the carrier in movement.

As is sketched in FIG. 3b, a striped structure arises on the object 6 during exposure by the projector as the carrier 1 moves.

Figure 4:
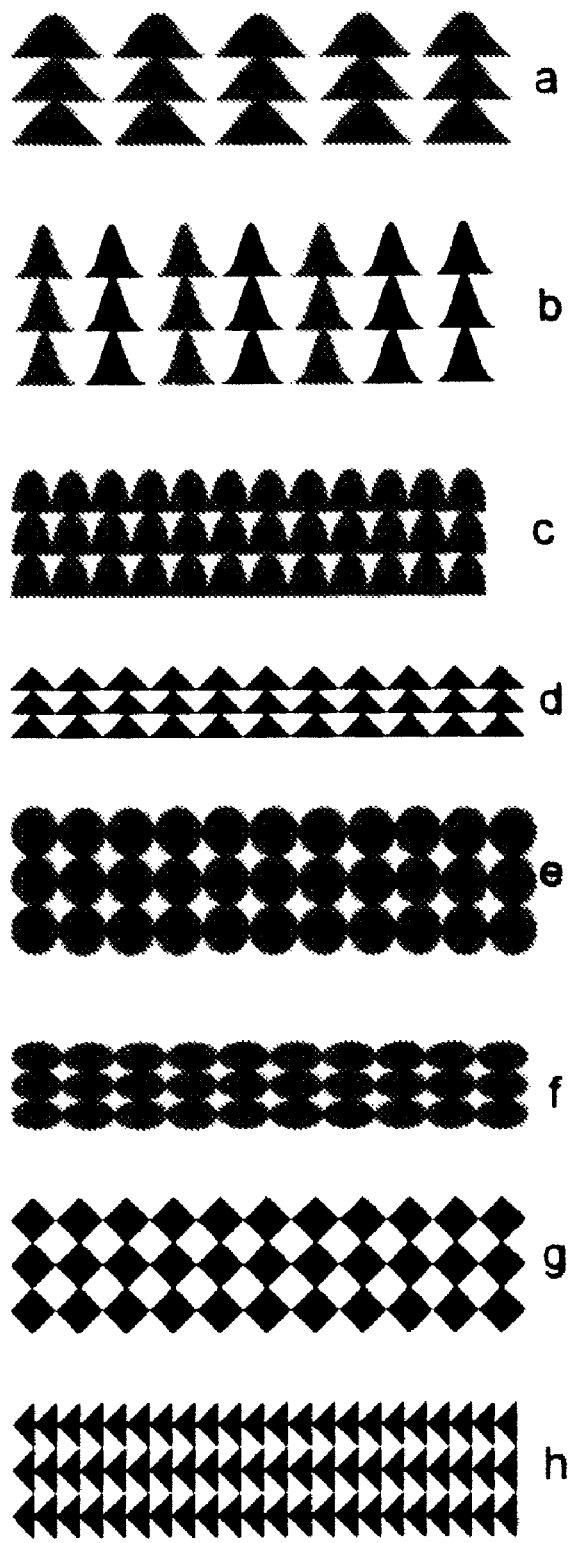
FIG. 4 shows an illustration of an exemplary selection of possible projection patterns.

FIG. 4 shows a selection of possible structures for the projection patterns 2 which can be used individually or in combination according to requirement. In a way similar to the example shown in FIG. 3a for dark colored full sine waves, a multiplicity of the corresponding pattern curves are applied one below another on the carrier 1 in all the variants a) to h) of the projection patterns 2.

Figure 5:
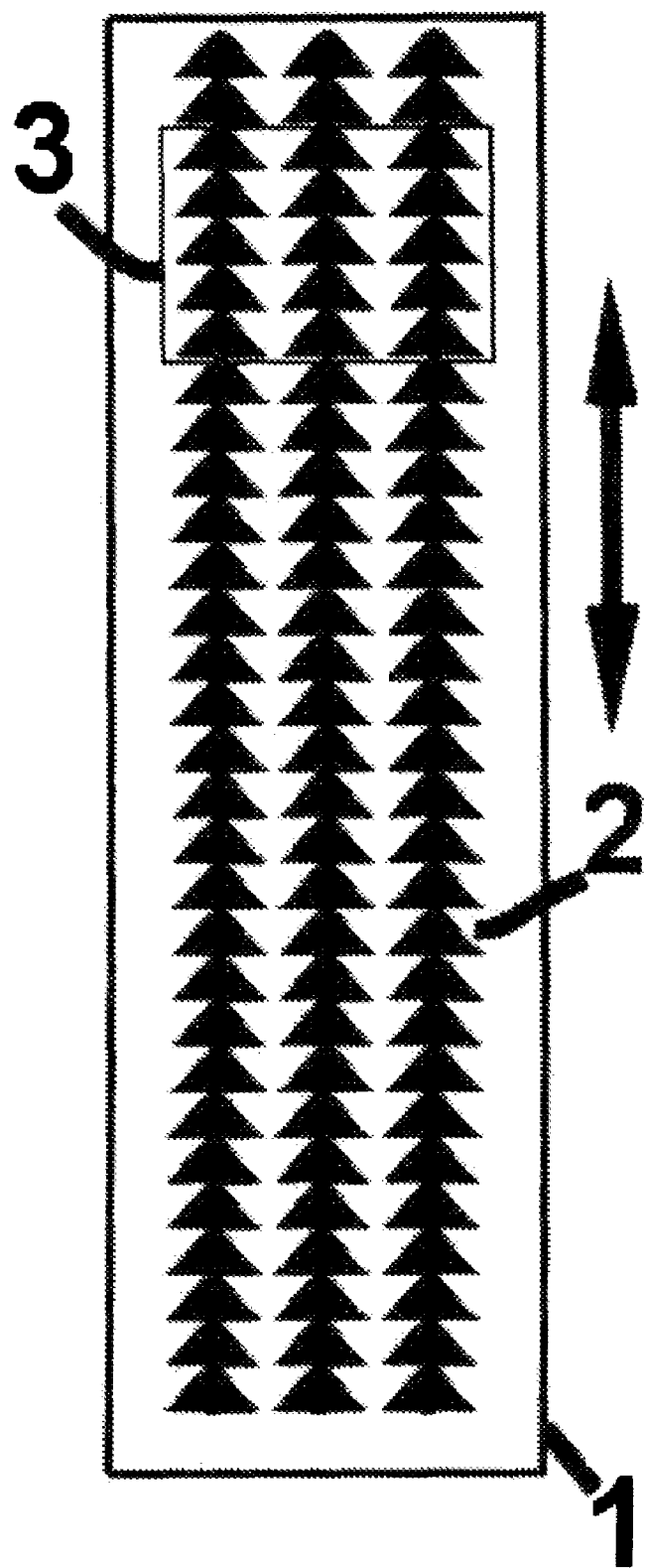
FIG. 5 shows a top view of a linear embodiment of the carrier.

By way of example, FIG. 4 shows a selection of conceivable individual structures, specifically:
a) filled full sine waves
b) filled Gaussian bells
c) filled parabolas
d) filled spikes
e) filled circles
f) filled ellipses
g) filled rhomboids
h) filled triangles An embodiment of a carrier 1 for linear displacement in the projector is to be seen in top view in FIG. 5. A multiplicity of integrated sine curves, for example, are applied one below another as projection pattern 2. By displacing the carrier 1 during the exposure phase, the projection patterns 2 projected onto the object 6 become so unsharp that stripes become visible in the image. Consequently, the projection pattern 2 must be of larger design than the projection window 3.

Figure 6:
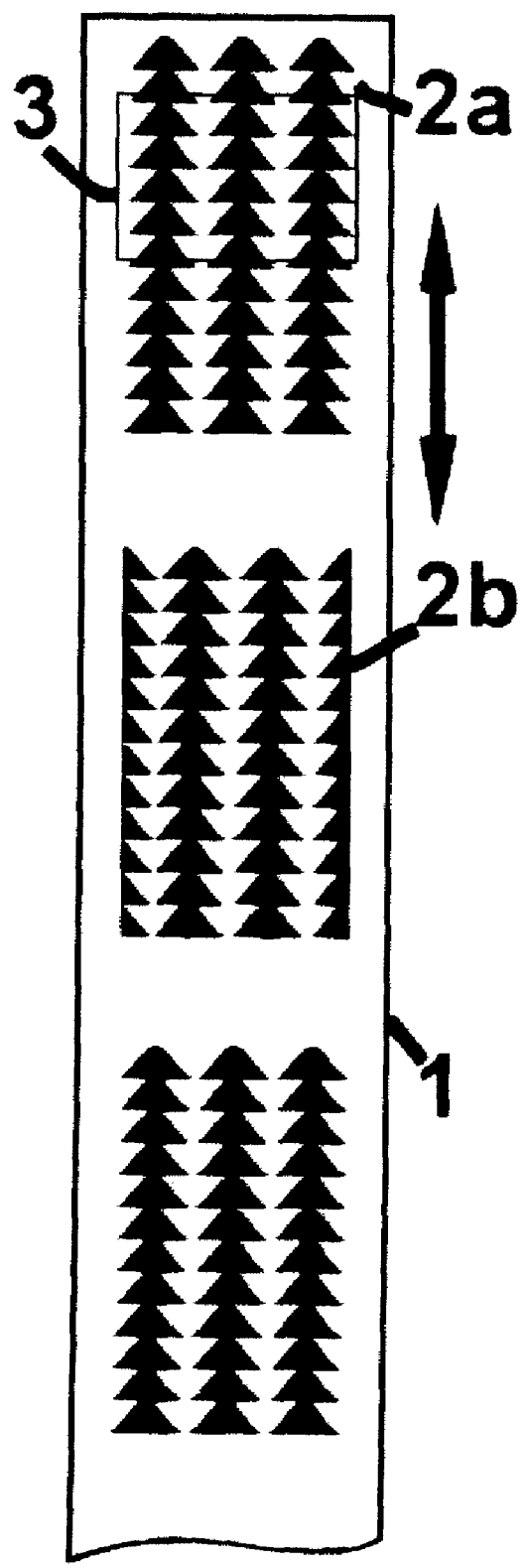
FIG. 6 shows a top view of a linear embodiment of the carrier, having a number of projection patterns arranged in a laterally displaced fashion.

Another embodiment of a carrier 1 for linear displacement in the projector is to be seen in top view in FIG. 6. As the carrier 1 is being displaced, various subregions of the projection pattern 2a are brought sequentially into the projection window 3. As displacement continues, various subregions of a further projection pattern 2b are brought into the projection window 3 after some time. The projection pattern 2b is configured in this case in such a way as to yield upon projection a displaced striped structure tuned for projecting the projection pattern 2a in accordance with the selected topometric measuring method.

Figure 7:
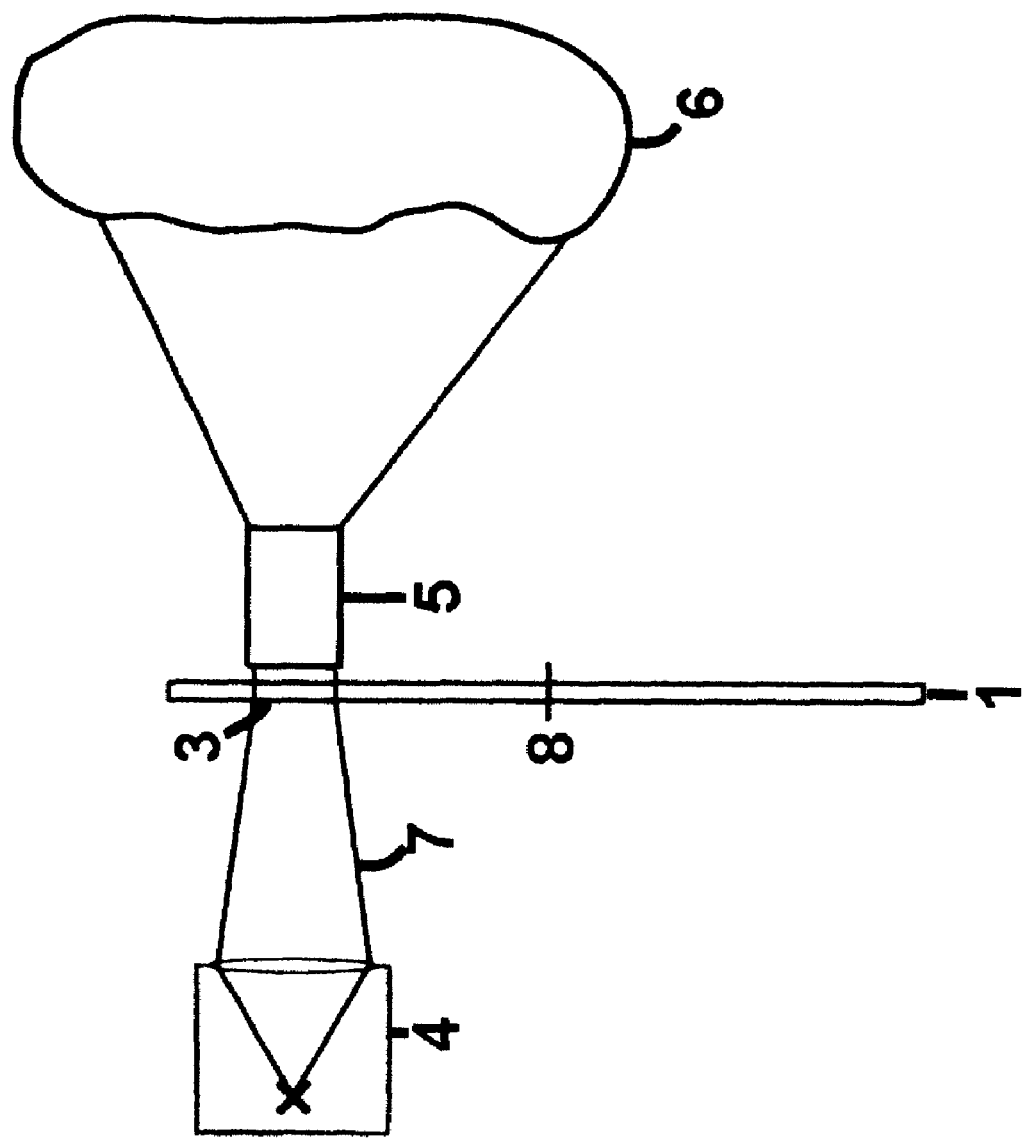
FIG. 7 shows a side view of an embodiment of the projection unit according to the invention, with rotating carrier movement.

An embodiment of the projector with a round carrier 1, that is to say a disk, is to be seen in side view in FIG. 7. It becomes clear that the carrier 1 is arranged such that it can rotate about the axis of rotation 8 in the beam path 7 between the illumination unit 4 and the lens arrangement 5. Again, the projector is aligned such that a subregion of the projection pattern 2 is projected onto an object 6. Owing to the rotational movement of the disk, a multiplicity of individual structures of the projection pattern 2 traverse the projection window 3 and are imaged on the object 6 and in an image acquired from the object 6 as a striped pattern with a desired movement and unsharpness.

Figure 8A:
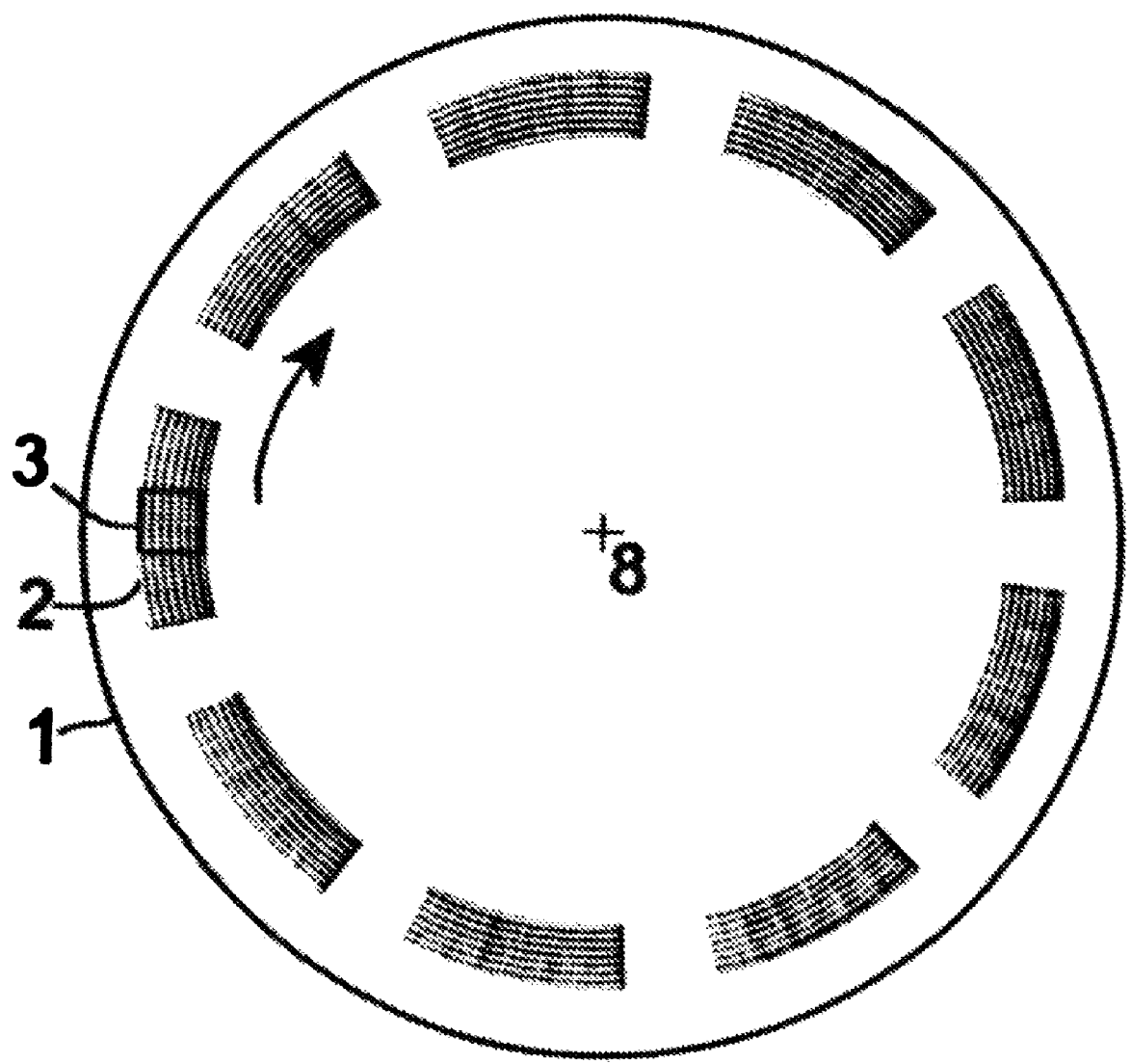
FIG. 8a shows a top view of a round embodiment of the carrier having a number of projection patterns.

A round embodiment of the carrier 1, that is to say a disk, is to be seen in top view in FIG. 8a. A multiplicity of projection patterns 2 are arranged on a circular track on the disk 1. As the disk rotates about an axis of rotation 8 of the disk, the projection patterns 2 are brought sequentially into an observation window 3 in the beam path 7 between an illumination unit 4 and an object 6. The individual structures of the projection patterns 2 lie on circular tracks whose center should lie at the point of rotation 8 of the disk.

Figure 8B:
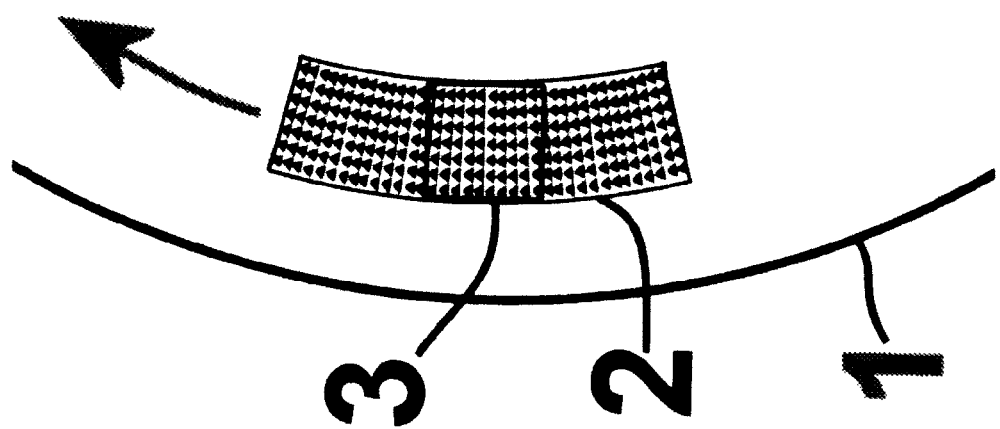

FIG. 8b illustrates a subregion of FIG. 8a in an enlarged fashion. The projection window 3 together with the projection pattern 2, moved below the projection window 3 during rotational movement, on the carrier 1 is well in evidence here.

The invention claimed is:

1. A projector for topometric three-dimensional optical measurement of an object, comprising
    an illumination unit;
    a lens;
    a movable carrier with a projection pattern of individual repeating geometrical structures on its surface, the movable carrier being arranged between the illumination unit and the lens; and
    a projection window, the projection window being disposed between the illumination unit and the lens and bordering a subregion of the projection pattern of the movable carrier;
    wherein the lens, the projection window and the subregion of the projection pattern are aligned with a beam path of the illumination unit, and wherein the individual repeating geometrical structures on the surface of the projection pattern are arranged such that a stripe shaped pattern other than the projection pattern is imaged on the object due to movement unsharpness when the projection pattern is moved in the beam path.

2. The projector of claim 1, wherein the projection pattern exhibits a multiplicity of sinusoidal curved shapes with dark colored areas below the sinusoidal arcs.

3. The projector of claim 1, wherein the projection pattern exhibits a multiplicity of Gaussian curved shapes with dark colored areas below the Gaussian bell.

4. The projector of claim 1, wherein the projection pattern exhibits a multiplicity of parabola-like curved shapes with dark colored areas below the parabolic segments.

5. The projector of claim 1, wherein the projection pattern exhibits a multiplicity of spiked curved shapes with dark colored areas below the spikes.

6. The projector of claim 1, wherein the projection pattern exhibits a multiplicity of filled circles lined up juxtaposed.

7. The projector of claim 1, wherein that the projection pattern exhibits a multiplicity of filled ellipses lined up juxtaposed.

8. The projector of claim 1, wherein that the projection pattern exhibits a multiplicity of filled rhomboids lined up juxtaposed.

9. The projector of claim 1, wherein that the projection pattern exhibits a multiplicity of filled triangles lined up juxtaposed.

10. The projector of claim 1, wherein that the projection pattern exhibits a multiplicity of filled polygons lined up juxtaposed.

11. The projector of claim 1, wherein the of individual repeating geometrical structures of the projection pattern are aligned in a linear fashion.

12. The projector of claim 1, wherein the of individual repeating geometrical structures of the projection pattern are aligned in a circular fashion.

13. The projector of claim 1, wherein the movable carrier further comprises markings for triggering the illumination unit.

14. The projector of claim 1, wherein the movable carrier further comprises markings for triggering an observation camera.

15. The projector of claim 1, wherein the movable carrier further comprises a motor.

16. The projector of claim 15, wherein an encoder is coupled to the motor.

17. The projector of claim 1, wherein the movable carrier is capable of continuous movement.

18. The projector of claim 1, wherein movement of said movable carrier results in projection of strips stripes of defined thickness and spacing onto the object that is being measured.

19. A projector for topometric three-dimensional optical measurement of an object, comprising
    an illumination unit;
    a lens;
    a movable carrier with a non-striped projection pattern of a multiplicity of individual repeating geometrical structures on its surface, the movable carrier being arranged between the illumination unit and the lens; and
    a projection window, the projection window being disposed between the illumination unit and the lens and bordering a subregion of the projection pattern of the movable carrier;
    wherein the lens, the projection window and the subregion of the projection pattern are aligned with a beam path of the illumination unit, and wherein the multiplicity of individual repeating geometrical structures on the surface of the projection pattern are arranged such that a stripe shaped pattern is imaged on the object due to movement unsharpness when the projection pattern is moved in the beam path.

20. The projector of claim 19, wherein the multiplicity of individual repeating geometrical structures are selected from the group consisting of sinusoidal curved shapes with dark colored areas below the sinusoidal arcs, Gaussian curved shapes with dark colored areas below the Gaussian bell, parabola-like curved shapes with dark colored areas below the parabolic segments, spiked curved shapes with dark colored areas below the spikes, filled circles lined up juxtaposed, filled ellipses lined up juxtaposed, filled rhomboids lined up juxtaposed, filled triangles lined up juxtaposed, and filled polygons lined up juxtaposed.

* * * * *